United States Patent [19]
Leonard

[11] 3,906,831
[45] Sept. 23, 1975

[54] MUSIC WRITING BOARD

[76] Inventor: Verna M. Leonard, 8701 Highway 41, Fresno, Calif. 93710

[22] Filed: July 24, 1974

[21] Appl. No.: 491,259

[52] U.S. Cl. .................................. 84/475; 84/471
[51] Int. Cl.² ........................................ G09B 15/02
[58] Field of Search .......................... 84/470–475, 84/483; 283/47

[56] References Cited
UNITED STATES PATENTS
| | | | |
|---|---|---|---|
| 979,193 | 12/1910 | Nelson | 84/473 |
| 3,728,462 | 4/1973 | Leonard | 84/471 |

*Primary Examiner*—Stephen J. Tomsky
*Assistant Examiner*—John F. Gonzales
*Attorney, Agent, or Firm*—Ralph S. Branscomb

[57] ABSTRACT

The invention is provided as an aid to musical composition and comprises a simple frame with a writing surface and a plurality of selectively exposable panels on the left side, each panel displaying the name and incidental arrangement of a particular key signature such that the incidentals align with the proper lines and spaces of a staff or staffs of the staff paper disposed on the writing surface. A plurality of panels may also be provided which display different time signatures.

6 Claims, 2 Drawing Figures

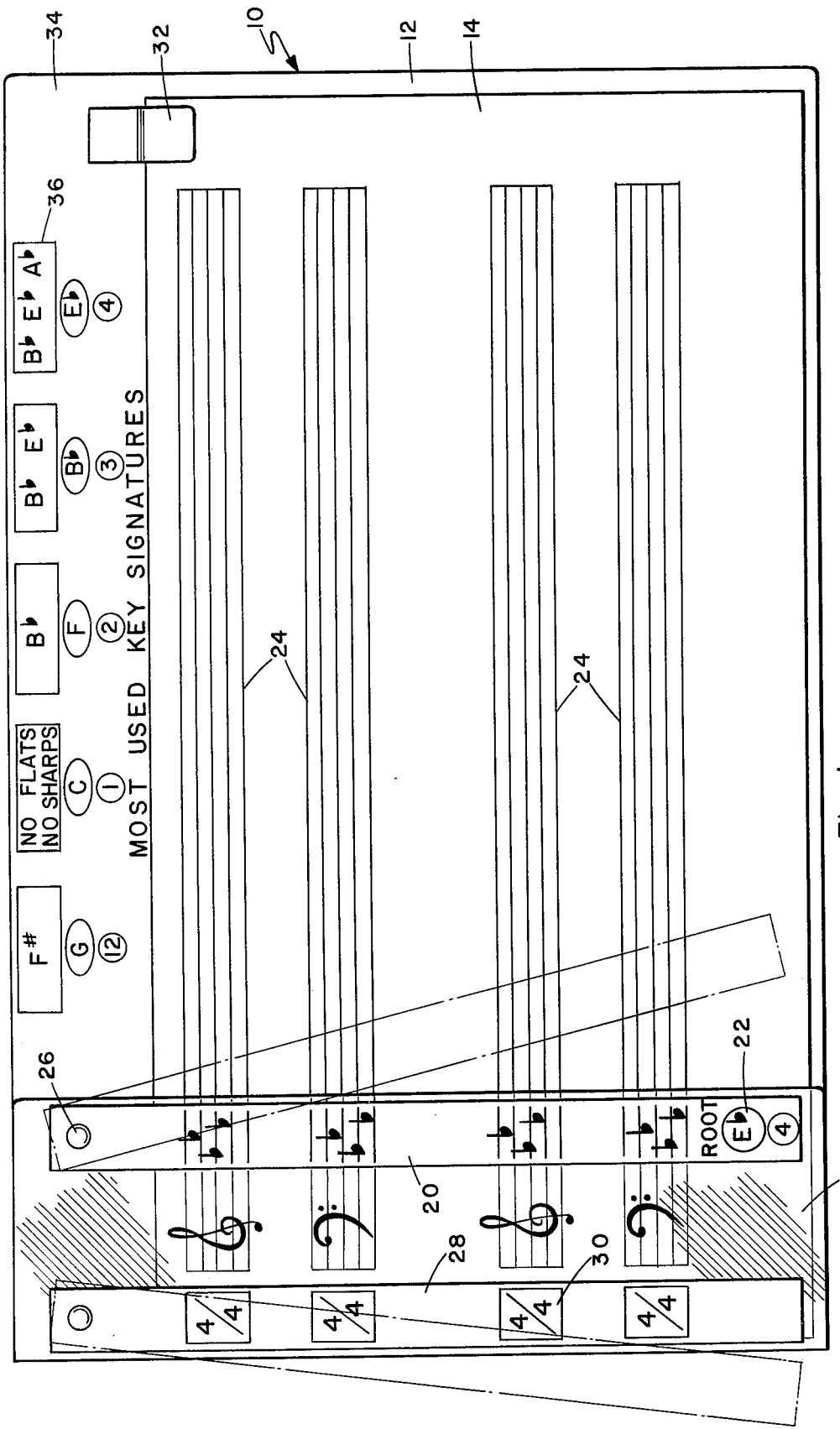
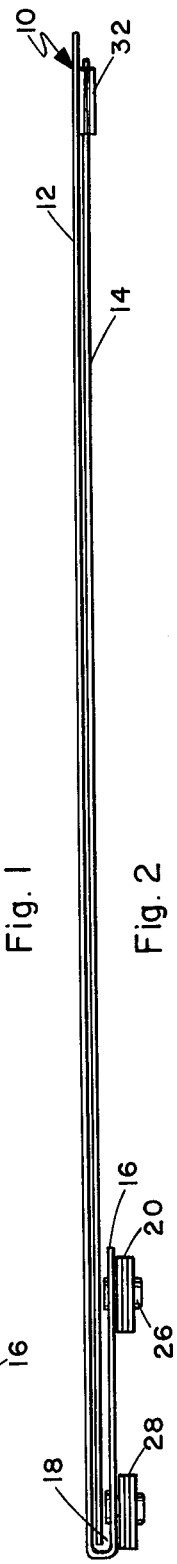
Fig. 1
Fig. 2

MUSIC WRITING BOARD

BACKGROUND OF THE INVENTION

Music writers generally compose on blank staff paper and write in the incidentals appropriate to the key signature as they compose. Because of the many different key signatures, each requiring a different selection of sharps and flats, recalling the various arrangement of incidentals becomes problematic even to the experienced composer, especially when a number of different and uncommon key signatures are represented in a single composition.

There is therefore a need for a music writing board which provides a writing surface for the placement of staff paper and includes means for easily determining and transferring to the staff the incidentals of the chosen key signature.

SUMMARY OF THE INVENTION

The present invention fulfills the above mentioned need and comprises a frame having a writing surface and pocket packet at the left side such that one or more sheets of staff paper can be placed on the writing surface with the left end or ends disposed in the pocket. The portion of the frame defining the top of the pocket is transparent so that the staffs of the staff paper can be seen therethrough, and pivoted to the pocket top is a plurality of panels, each having displayed thereon the incidentals of a particular key signature such that the incidentals align with the appropriate lines and spaces on the staff paper. The panels are individually displayable so that the user may select the appropriate panel and, after writing in the notes on the staff paper, transcribe the incidentals directly onto the staff. There may also be provided a second set of panels, each displaying a time signature.

BRIEF DESCRIPTION OF THE DRAWINGS

FIG. 1 is a front elevational view of the device;
FIG. 2 is a view of the invention looking down at the top of device as shown in FIG. 1.

DETAILED DESCRIPTION OF THE PREFERRED EMBODIMENT

The invention comprises a frame 10 having a planar portion 12 which serves as a writing surface for a sheet of staff paper 14. An extension 16 of the planar portion is doubled over the writing surface and defines a pocket 18 into which the left end of the staff paper is inserted as shown. The extension 16 should be transparent and it is preferred that the entire frame be constructed of clear plastic.

Mounted on the extension 16 is a plurality of panels 20, each of which has displayed thereon an arrangement of flats or sharps characterizing a particular key signature, the exposed panel in FIG. 1 representing the key of $E^b$ as indicated at 22 and having the three flats 24 of that key thereon. The incidentals of the panels are arranged so that they align with the appropriate lines and spaces of the staffs 24 on the staff paper, and the panels are pivoted on the extension 16 at 26 so they can be individually moved into the position of the $E^b$ panel in the drawing. Panels may be pivoted to a position completely removed from the staff paper, a partially pivoted panel being shown in FIG. 1.

A second plurality of similarly mounted panels 28 may be provided as shown, each relative to a particular time signature and having indicia 30 identifying the time signature in quantities equal to the number of staffs on the paper to be used and disposed on the panel to be adjacent the ends of the staffs when the staffs are aligned with the incidentals on the other panels 20.

The two groups of panels are preferably mounted as shown to expose a portion of the transparent extension 16 therebetween. This arrangement permits both the time signature indicia and the incidentals to appear adjacent the staffs to provide an overall appearance of a sheet of music having everything thereon except the notes.

It is preferred that the height dimension of the writing surface 12 be greater than that of the staff paper and a clip 32 be provided to locate the paper on the lower portion of the writing surface to preserve an upper portion 34. On the exposed portion is a display 36 of the most used key signatures which includes a tabulation of the scale tones which are flatted or sharped. This information supplements the incidental displays on the panels, which do not indicate the scale tone names of the raised and lowered notes.

In use, the composer inserts one or more sheets of staff paper into the pocket 18 as shown securely locating it with the clip 32, and selects the particular strips representing the key and time signature in which he will write. Upon completion of a sheet of staff paper, or changing to another key signature, the information on the exposed panel is transferred directly onto the staffs, relieving the composer completely of the burden of remembering the incidentals in the key signatures. If prior to completion of an entire sheet it is rejected, it can be thrown away prior to transferring the key and time signatures and thus with some saving of time.

I claim:

1. A music composition aid comprising:
   a. a frame including a planar portion to serve as a writing surface for a sheet of musical staff paper;
   b. a plurality of selectively exposable members mounted on a left hand portion of said frame, each of said members having a representation thereon of the incidentals of a particular key signature spaced to align with the corresponding lines and spaces of a staff on a sheet of staff paper disposed on said writing surface;
   c. releasible clip means mounted on said frame to engage a piece of staff paper and locate same such that the lines and spaces thereof align with the incidentals of the particular key signature, whereby a plurality of sheets of staff paper may be sequentially used on said aid.

2. Structure according to claim 1 wherein the left-hand portion of said frame comprises an extension of said planar portion doubled over said writing surface to define a pocket to receive the left portion of a sheet of musical staff paper, said extension being transparent to visually expose the lines and spaces of a sheet of staff paper to facilitate the alignment thereof with said incidentals.

3. Structure according to claim 2 wherein said selectively exposable members comprise elongated panels pivoted at the upper portions thereof to said extension.

4. Structure according to claim 3 and including a second plurality of selectively exposable panels pivoted at the upper portions thereof to said platform, each of said second panels having indicia thereon representing a particular time signature and said indicia being alignable with the staff of a sheet of music paper inserted in said pocket.

5. Structure according to claim 4 wherein the first mentioned panels are spaced from said second panels on said panel to permit viewing therebetween of a portion of the staff of musical staff paper inserted in said pocket.

6. Structure according to claim 1 wherein said clip means is mounted on the planar portion of said frame to engage and locate a piece of staff paper a distance below the upper edge of said planar portion to preserve an uncovered portion thereon, said uncovered portion displaying the names of several commonly used key signatures and naming the scale tones of said commonly used key signatures which are flatted or sharped.

* * * * *